3,260,617
METHOD FOR PREPARING SHELL MOLDING COMPOSITIONS
William D. Lawther, Hammond, Ind., assignor to Amsted Industries Incorporated, Chicago, Ill., a corporation of New Jersey
No Drawing. Filed Oct. 4, 1962, Ser. No. 228,238
5 Claims. (Cl. 117—100)

This invention relates generally to shell molds and more particularly to molding compositions and method of preparation thereof for forming shell molds or any other articles for shaping molten metals Compositions for forming shell molds and similar articles are generally comprised of sand and resin mixtures. Various other catalytic agents are, of course, included. However, the sand-resin mixtures of the prior art have not been entirely satisfactory.

For example, it is current practice to use liquid phenolic resins in the preparation of sand mixtures because mixtures made by blending dry powdered phenolic resins and sand exhibit segregation of the resin from the sand subsequent to the mulling or blending operation. Commercially obtainable liquid phenolic resin compositions contain about 58–87% by weight of resin, the remaining portion consisting primarily of a diluent such as water, alcohol or blend of both.

Such sand-resin mixtures employing liquid resins overcome the difficulty of segregation. However, the resulting blends usually exhibit a different undesirable characteristic, that being, agglomeration (often referred to as clumping) occurring after the mulling or blending operation is completed. The sand-resin agglomerates are found to be most prevalent in warm coated sand mixtures. By warm coated sand mixtures is meant those mixtures wherein the resin is applied to sand which is heated to a temperature anywhere from approximately 160° to 250° F. The clumps or agglomerates thus formed prevent direct use of the sand-resin mixture in forming molds or related articles. That is, the clumps must first be mechanically broken, which sometimes can be done only with great difficulty, so as to form a free-flowing composition.

Various proposals have been advanced for the elimination of such clumps, one of which was the addition of hexadecyl acetamide to the mixture during the mulling operation. However, such additions have not proven to be sufficiently effective. Also, the quantities of such additives necessary to achieve any degree of effectiveness increased the cost of the resulting mixture.

Accordingly, it is an object of this invention to provide a substantially free-flowing sand and resin composition.

Another object of this invention is the provision of a novel method for preparing sand-resin mixtures having greatly increased fluidity.

Other objects and advantages will become apparent from the following description including illustrative examples therein.

In accordance with the invention it has been found that an extra amount of water added to the sand mixture near the end of its mulling cycle results in a sand-resin mixture substantially free of agglomerates even after extended periods of storage.

The following illustrative examples are not intended to be limitations on the scope of this invention.

*Example 1*

At room temperature, 97 lbs. of warm AFS (American Foundrymen's Society) #85 silica sand was placed within a conventional muller with 3 lbs. 11 oz. of a two-stage phenol-formaldehyde resin which in this example consisted of 68% resin solids in a solvent system of approximately 25% ethyl alcohol and 7% water. To this mixture of sand and resin was added 6 oz. of hexamethylenetetramine, a hardening agent, and 2 oz. of calcium stearate, a release agent. All of the ingredients were then mulled until a homogeneous mixture was attained. During the mulling process, and after an initial wet mixing period, a strong current of air was directed through the wet sand until the mixture approached dryness. When the mixing cycle was approximately 60% completed, an additional 4.5 oz. of water was added to the mixture. The mixing cycle was allowed to go to completion and the resin coated sand resulting therefrom was found to be free of any agglomerates or clumps.

*Example 2*

At normal ambient temperatures, 98 lbs. of zircon sand was placed within a conventional muller with 2 lbs. 7 oz. of a two-stage phenol-formaldehyde resin which was also comprised of 68% resin solids in a solvent of approximately 25% ethyl alcohol and 7% water. To this mixture of sand and resin was added 4 oz. of hexamethylenetetramine and 1.34 oz. of calcium stearate. All of the ingredients were mulled until a homogeneous mixture was obtained. However, during the mulling process, after an initial wet mixing period, a current of air was directed through the wet sand until the mixture approached dryness. Again, when the mixing cycle was approximately 60% completed, an additional 3.2 oz. of water was added to the mixture. The mixing cycle was allowed to go to completion and the resin coated sand resulting therefrom was again found to be free of any agglomerates.

As a further test, eight sand-resin mixtures were prepared employing varying constituents, and sand temperatures. Four of these sand-resin mixtures, prepared without the benefit of adding additional water to the mixture shortly before the completion of the mulling cycle as taught by this invention, were stored in one storage hopper while the other four sand-resin mixtures prepared in accordance with the invention were stored in another hopper. After allowing the mixes to stay overnight in their respective hoppers, it was found that the mixes prepared without the additional water agglomerated to such a degree as to prevent any flow out of the hopper while those mixes prepared in accordance with the invention exhibited a free-flowing characteristic.

The invention may, of course, be practiced equally well with substitutes for the various constituents of Examples 1 or 2. For example, forsterite, olivine, rutile, magnesite fines or Alundum fines, to name but a few, could be substituted singly or in combination for the silica or zircon sands. Additionally, phenol-furfural, urea formaldehyde, melamine formaldehyde, alkyd or polyester resins, or combinations thereof, could be substituted for phenol-formaldehyde. Also, such release agents as zinc stearate, lithium stearate, carnauba wax, Acrawax, Nopcowax, Nuodex or silicones could be used in place of calcium stearate.

Even though two-stage resins are preferred because of such factors as their ease of application and greater stability during storage, the invention may be practiced equally well with single-stage resins.

Various reasons have been advanced for the agglomeration occurring in sand-resin mixtures. However, it is believed that agglomeration occurs because of traces of solvent left in the resin after the sand-resin mixture has been apparently thoroughly blended and dried. Solvents such as alcohol, are readily miscible in water whereas uncured resin is only slightly miscible in water. Accordingly, it is further believed that the addition of an extra amount of water to the sand-resin mixture near the completion of its mixing cycle and the subsequent evaporation of such water during the completion of the mixing cycle aids in the extraction of the last traces of solvent alcohol from the resin film surrounding the sand grains.

In further tests it was found that the optimum time for the introduction of such additional water, where the entire mixing cycle was 6.25 minutes, was 2.5 minutes prior to the end of such mixing cycle. At this time it was also discovered that under such conditions a water addition ranging from 0.15% to 0.33% by weight as compared to the total weight of the other constituents comprising the mix presented superior results.

Various factors will, however, influence both the quantity of additional water to be added to the mix and the exact time of introduction thereof. Such factors are, for example, the temperature of the sand, the ambient temperature and humidity, the ratio of resin to sand, the rapidity of mixing and the total cycle time. Such factors, however, may be readily taken into account by those skilled in the art.

Although but two specific examples of the invention have been disclosed, it is apparent that other modifications are possible within the scope of the appended claims.

I claim:

1. A method of preparing a free-flowing coated sand composition comprising the steps of: heating sand to a temperature of between 160° to 250° F., mixing together 97.0 parts by weight of said heated sand, about 3.7 parts by weight of a phenolic resin of which an alcohol solvent comprises approximately 25%, about 0.4 part by weight of hexamethylenetetramine, and about 0.1 part by weight of calcium stearate; continuing to mix the ingredients while directing a flow of air through the sand mixture; when the mixing cycle is about 60% completed adding about 0.3 part by weight of water only to the sand mixture; and continuing to mix the sand mixture until the sand mixture is dry.

2. A method of preparing a free-flowing coated sand composition comprising the steps of: heating sand to a temperature of between 160° to 250° F., mixing together 98 parts by weight of said heated sand, about 2.4 parts by weight of a phenolic resin of which an alcohol solvent comprises approximately 25%, about 0.3 part by weight of hexamethylenetetramine, and about 0.08 part by weight of calcium stearate; continuing to mix the ingredients while directing a flow of air through the sand mixture; when the mixing cycle is about 60% completed adding about 0.2 part by weight of water only to the sand mixture; and continuing to mix the sand mixture until the sand mixture is dry.

3. A method of preparing a free-flowing coated sand composition comprising the steps of: mixing heated sand with a liquid of phenolic resin in an alcohol solvent, a hardening agent and a release agent; mulling the ingredients until the mixing cycle is at least 60% completed; adding water only to said mixture in the amount of about 0.3 part by weight of the entire mixture; and continuing the mulling until the mixing cycle is completed.

4. A method of preparing a free-flowing coated sand composition comprising the steps of: mixing heated sand with a liquid of thermosetting resin in an alcohol solvent, a hardening agent and a release agent; mulling the ingredients until the mixing cycle is at least 60% completed; adding water only to said mixture in the amount of about 0.3 part by weight of the entire mixture; and continuing the mulling until the mixing cycle is completed.

5. A method of preparing a free-flowing coated sand composition comprising the steps of: mixing heated sand with a liquid of thermosetting resin in an alcohol solvent, a hardening agent, and a release agent; mulling the ingredients until the mixing cycle is about 60% completed; adding an additional amount of water only to said mixture in the order of 0.15% to 0.33% by weight as compared to the total weight of said mixture; and continuing the mulling until the mixture is dry.

References Cited by the Examiner

UNITED STATES PATENTS

| | | | |
|---|---|---|---|
| 2,806,832 | 9/1957 | Drumm et al. | 117—100 |
| 2,888,418 | 6/1959 | Albanese et al. | 117—100 |
| 2,965,514 | 12/1960 | Less et al. | 117—100 |

WILLIAM D. MARTIN, *Primary Examiner.*

S. W. ROTHSTEIN, *Assistant Examiner.*